United States Patent
Ikeda et al.

(10) Patent No.: US 8,376,476 B2
(45) Date of Patent: Feb. 19, 2013

(54) BRAKE SYSTEM IN ELECTRIC DRIVE DUMP TRUCK

(75) Inventors: Jun Ikeda, Tsuchiura (JP); Takashi Yagyu, Ushiku (JP); Tomohiko Yasuda, Kashiwa (JP); Yutaka Watanabe, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 327 days.

(21) Appl. No.: 12/090,940

(22) PCT Filed: Aug. 10, 2007

(86) PCT No.: PCT/JP2007/065765
§ 371 (c)(1),
(2), (4) Date: Apr. 21, 2008

(87) PCT Pub. No.: WO2008/029593
PCT Pub. Date: Mar. 13, 2008

(65) Prior Publication Data
US 2009/0179486 A1   Jul. 16, 2009

(30) Foreign Application Priority Data
Sep. 5, 2006  (JP) .................................. 2006-240587

(51) Int. Cl.
*B60T 8/17* (2006.01)
(52) U.S. Cl. ................. 303/152; 303/3; 303/10; 303/20; 303/121; 303/122.09; 303/122.13; 303/155; 188/156; 188/158; 188/162; 701/22; 701/70
(58) Field of Classification Search ............... 303/152.3, 303/3, 152, 121, 20, 10, 15, 155; 180/272; 701/70
See application file for complete search history.

(56) References Cited

U.S. PATENT DOCUMENTS

| | | | |
|---|---|---|---|
| 4,307,300 A * | 12/1981 | Kisami | 307/9.1 |
| 5,322,352 A * | 6/1994 | Ohno et al. | 303/3 |
| 6,457,784 B1 | 10/2002 | Bohm et al. | |
| 7,167,783 B2 * | 1/2007 | Park et al. | 701/22 |
| 2003/0184152 A1 | 10/2003 | Cikanek et al. | |
| 2004/0090116 A1 * | 5/2004 | Tsunehara | 303/152 |
| 2004/0212245 A1 * | 10/2004 | Tsunehara et al. | 303/3 |
| 2006/0001314 A1 * | 1/2006 | Teslak et al. | 303/152 |
| 2006/0086547 A1 | 4/2006 | Shimada et al. | |

FOREIGN PATENT DOCUMENTS

| | | |
|---|---|---|
| DE | 198 10 656 A1 | 9/1999 |
| DE | 103 13 519 A1 | 10/2003 |
| EP | 1470979 A2 | 10/2004 |
| JP | 5-501687 A | 4/1993 |
| JP | 7-228242 | 8/1995 |
| JP | 2003-269205 A | 9/2003 |
| JP | 2006-166684 | 6/2006 |
| WO | 91/08121 A1 | 6/1991 |

* cited by examiner

*Primary Examiner* — Robert A Siconolfi
*Assistant Examiner* — San Aung
(74) *Attorney, Agent, or Firm* — Mattingly & Malur, PC

(57) ABSTRACT

A brake system in an electric drive dump truck. The electric drive dump truck has a generator 11 driven by an engine 10 and traveling motors 13L, 13R driven with electric power generated by the generator 11. Hydraulic brakes 20L, 20R, 21L, 20R are operated by brake pedal 18. An oil pressure sensor 22 detects hydraulic fluid pressure produced in accordance with the amount of depression of the brake pedal 18 and a control unit 14 controls the traveling motors 13L, 13R so as to operate them as generator-type retarders when the hydraulic fluid pressure P detected by the oil pressure sensor 22 is not smaller than a predetermined value P1.

3 Claims, 6 Drawing Sheets

BRAKE SYSTEM IN ELECTRIC DRIVE DUMP TRUCK

TECHNICAL FIELD

The present invention relates to an electric drive dump truck having a generator which is driven by an engine and a traveling motor which is driven with electric power generated by the generator. More particularly, the present invention is concerned with a brake system in an electric drive dump truck wherein a traveling motor is operated as a generator-type retarder.

BACKGROUND ART

An electric drive vehicle comprises an engine as a power source, a generator adapted to be driven by the engine, and a traveling motor adapted to be driven with electric power generated by the generator. Power of the traveling motor is transmitted to wheels of the vehicle, thereby making the vehicle travel. As a brake system provided in such an electric drive vehicle, there is known a brake system (see, for example, Patent Literature 1) in which a traveling motor is operated as a generator-type retarder (more particularly, the traveling motor is operated as a generator to convert kinetic energy into electrical energy, thereby actuating the brake).

On the other hand, as a brake system for an industrial vehicle, there is known a brake system (see, for example, Patent Literature 2) having a service brake adapted to operate on the basis of operation of a brake pedal, an electromagnetic retarder provided as an auxiliary brake in an engine power transmission system, a detector for detecting the amount of depression of the brake pedal, and a controller which actuates the retarder in accordance with the amount of depression of the brake pedal detected by the detector. According to this conventional technique, when the amount of depression of the brake pedal is smaller than a predetermined amount, only the retarder is operated; when the amount of depression of the brake pedal is larger than the predetermined amount, both of the retarder and service brake are operated to increase the braking force.

Patent Literature 1: JP-A-2006-166684
Patent Literature 2: JP-A-7-228242

DISCLOSURE OF THE INVENTION

Problem to be Solved by the Invention

However, the above conventional techniques involve the following problem.

According to the conventional technique described in Patent Literature 2, only the electromagnetic retarder is operated when the amount of depression of the brake pedal is smaller than the predetermined amount. However, as shown in FIG. 8, it is known that the braking force of the electromagnetic retarder in a dump truck depends on the vehicle speed, and in a low vehicle speed region, the braking force decreases markedly or is not obtainable. Therefore, if the conventional technique in question is applied to a dump truck, then for example when a driver of the dump truck performs a fine operation of the brake pedal with the intention of stopping the dump truck at a predetermined position (e.g., a loading site), the braking force of the retarder will undergo a marked change or will not be obtained with decrease of the vehicle speed, thus making it difficult to stop the dump truck at the predetermined position.

It is an object of the present invention to provide a brake system in an electric drive dump truck capable of enhancing the braking force of a brake while maintaining fine operability of the brake.

Means for Solving the Problem (1) For achieving the above-mentioned object, according to the present invention, there is provided a brake system in an electric drive dump truck having an engine, a generator driven by the engine, a traveling motor driven with electric power generated by the generator, and a hydraulic brake operated by operation of a brake pedal, the brake system comprising detector means for detecting an amount of depression of the brake pedal and control means for controlling the traveling motor so as to operate the same as a generator-type retarder when the amount of depression of the brake pedal detected by the detector means is not smaller than a predetermined value.

In the present invention, the control means controls the traveling motor so as to operate the same as the generator-type retarder when the amount of depression of the brake pedal detected by the detector means is not smaller than the predetermined value. More specifically, when for example the amount of depression of the brake pedal is smaller than the predetermined value, only the service brake such as a hydraulic brake operates. Thus, irrespective of the vehicle speed, it is possible to obtain a braking force of the service brake corresponding to the amount of depression of the brake pedal and hence possible to maintain fine operability of the brake. On the other hand, when the amount of depression of the brake pedal is larger than the predetermined amount, not only does the service brake operate, but also the traveling motor operates as a generator-type retarder. Thus, it is possible to enhance the braking force for example in the event of an emergency. Accordingly, in the present invention, it is possible to enhance the braking force of the brake while maintaining fine operability of the brake.

(2) In the above (1), preferably, the control means causes the braking force of the generator-type retarder to change continuously in accordance with the amount of depression of the brake pedal.

(3) In the above (1), preferably, the service brake is a hydraulic brake, the brake system further comprises a hydraulic valve adapted to produce a hydraulic fluid pressure corresponding to the amount of depression of the brake pedal and output it to the hydraulic brake, and the detector means is an oil pressure detector for detecting the hydraulic fluid pressure outputted from the hydraulic valve to the hydraulic brake.

Effect of the Invention

According to the present invention, it is possible to enhance the braking force of a brake while maintaining fine operability of the brake.

Figure 1:
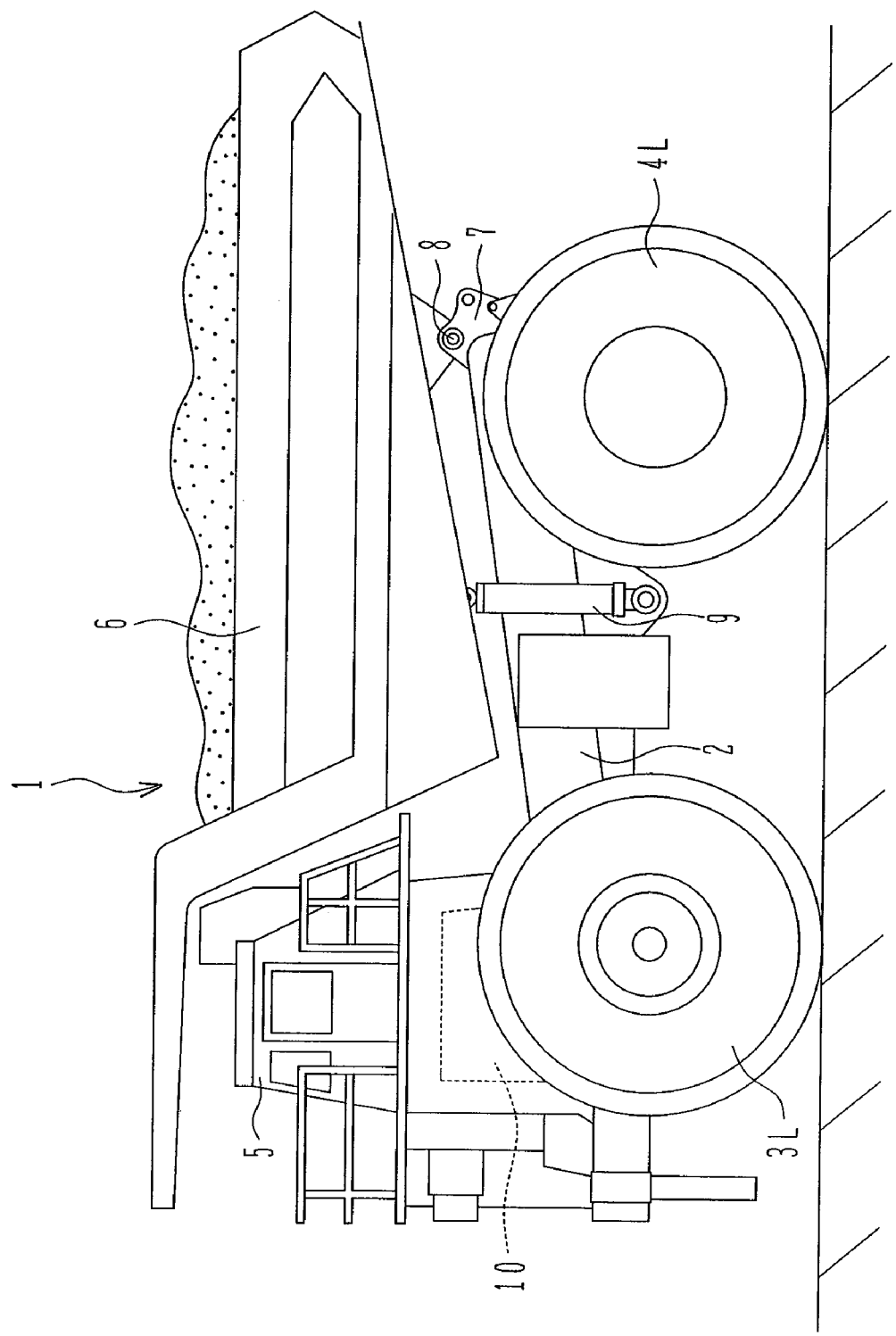
FIG. 1 is a side view showing an example of entire structure of an electric drive dump truck to which the present invention is applied.

EXPLANATION REFERENCE CHARACTERS 10 engine
11 generator
13L, 13R traveling motor
14 control unit (control means)
18 brake pedal
19 brake valve (hydraulic valve)
20L, 20R front hydraulic brake (service brake)
21L, 21R rear hydraulic brake (service brake)
22 oil pressure sensor (detector means, oil pressure detector)

BEST MODE FOR CARRYING OUT THE INVENTION

An embodiment of the present invention will be described below with reference to the drawings.

FIG. 1 is a side view showing an example of entire structure of an electric drive dump truck to which the present invention is applied.

In FIG. 1, the dump truck 1 is a two-shaft rear dump truck. The dump truck 1 includes a body (main frame) 2, front wheels 3L, 3R and rear wheels 4L, 4R mounted rotatably on a lower side of the body 2, a cab 5 formed on a front side of the body 2, and a loading bed (vessel) 6 mounted tiltably on a rear side of the body 2 for carrying soil, sand, stones, etc. The loading bed 6 is mounted to a bracket 7 on the rear side of the body 2 in a vertically tiltable manner through a hinge pin 8 and is adapted to tilt in accordance with expansion and contraction of a dump cylinder 9.

An engine 10 as a drive source is mounted on the body 2. A drive system is also provided which converts power of the engine 10 into electrical energy and rotates for example the rear wheels 4L, 4R by utilizing that electrical energy.

Figure 2:
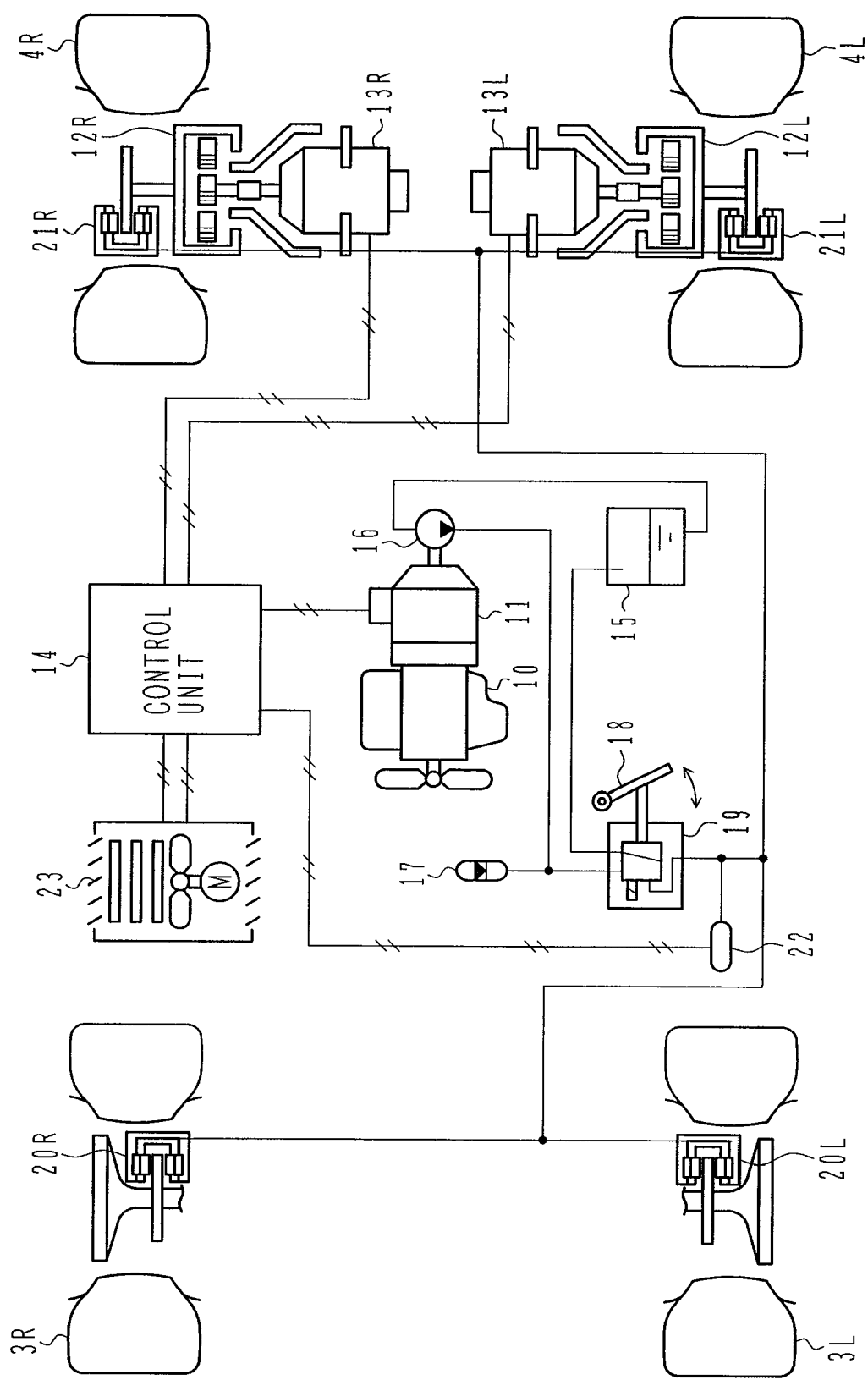
FIG. 2 is a schematic diagram showing a drive system together with the construction of a brake system in the electric drive dump truck according to an embodiment of the present invention

FIG. 2 illustrates schematically the construction of principal portions of the aforesaid drive system and the construction of a brake system according to an embodiment of the present invention.

In FIG. 2, there are provided the engine 10, a generator 11 which is driven by the engine 10, left and right traveling motors 13L, 13R which are for example connected to rotating shafts of the rear wheels 4L, 4R respectively via reduction gears 12L, 12R and driven with electric power generated by the generator 11, an accelerator pedal (not shown) which prescribes a rotational speed of the traveling motors 13L, 13R, a shift lever which prescribes a rotational direction (in other words, such a traveling direction as forward or reverse, or neutral) of the traveling motors 13L, 13R, and a control unit 14 to which are inputted an operation signal based on the amount of depression (depression angle) of the accelerator pedal and an operation signal based on an operational position of the shift lever. The control unit 14, as a first function (travel control function) thereof, controls inverters 26L, 26R (see FIG. 9) in accordance with operation signals provided from the accelerator pedal and the shift lever, and controls the frequency and phase of an alternating current to be fed from the generator 11 to the traveling motors 13L, 13R through a rectifier 25 (see FIG. 9) and the inverters 26L, 26R. As a result, the traveling motors 13L, 13R operate, and the rear wheels 4L, 4R rotate through the reduction gears 12L, 12R. The control unit 14 controls the number of revolutions of the engine 10 so as to obtain required electric power though the details are not shown.

Further provided are a hydraulic pump 16 adapted to be driven by the engine 10 and discharge hydraulic fluid provided from a hydraulic fluid tank 15, an accumulator 17 for temporarily storing the hydraulic fluid discharged from the hydraulic pump 16, a brake valve (hydraulic valve) 19 having a brake pedal 18, front hydraulic brakes 20L, 20R (service brakes) mounted on rotational shafts of the front wheels 3L, 3R, and rear hydraulic brakes 21L, 21R (service brakes) mounted on rotational shafts of the rear wheels 4L, 4R.

Figure 3:
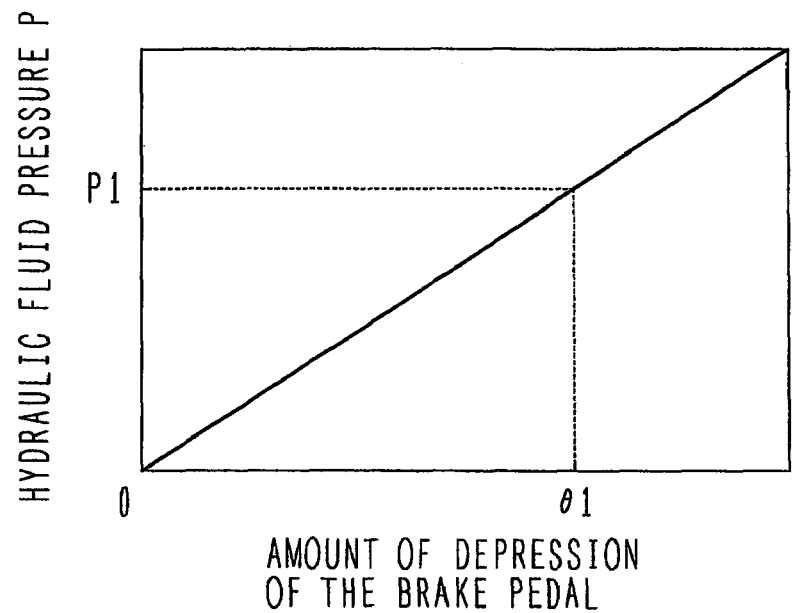
FIG. 3 is a characteristic diagram showing a hydraulic fluid pressure which a brake valve outputs in proportion to the amount of depression of a brake pedal in the electric-drive-dump-truck brake system of the embodiment.

In accordance with the amount of depression (depression angle) of the brake pedal 18, the brake valve 19 reduces the pressure of the hydraulic fluid provided from the accumulator 17 and produces a hydraulic fluid pressure, then outputs the produced hydraulic fluid pressure to the hydraulic brakes 20L, 20R, 21L, 21R. At this time, as shown in FIG. 3, the hydraulic fluid pressure P outputted from the brake valve 19 to the hydraulic brakes 20L, 20R, 21L, 21R increases monotonously in accordance with the amount of depression of the brake pedal 18 in the almost whole depression region. For example, a hydraulic fluid pressure P1 is obtained at the amount of depression θ1 of the brake pedal 18.

Figure 4:
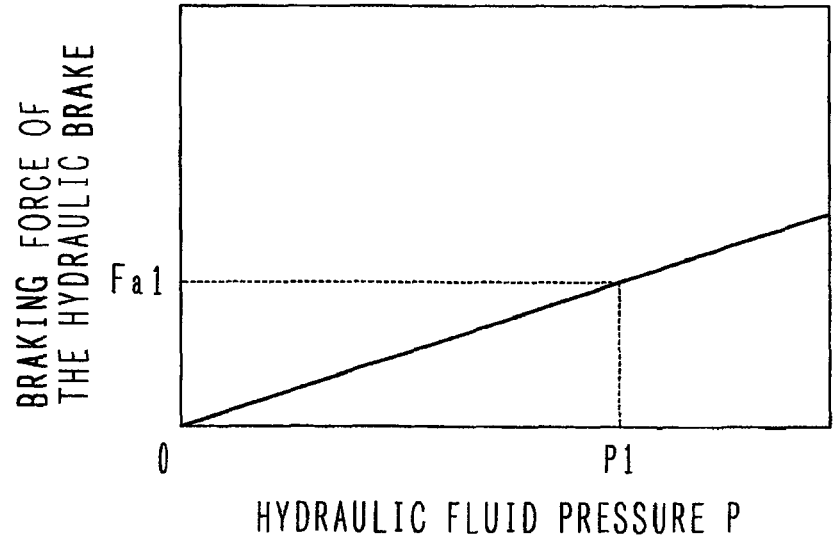
FIG. 4 is a characteristic diagram showing a relation between the hydraulic fluid pressure in the brake valve and a braking force of a hydraulic brake in the electric-drive-dump-truck brake system of the embodiment.

The hydraulic brakes 20L, 20R, 21L, 21R are, for example, disc brakes and are each provided with a hydraulic cylinder for actuating brake shoes which can be pushed against both side faces of a disc brake. The brake shoe pushing force varies in accordance with the hydraulic fluid pressure fed from the brake valve 19 to the hydraulic cylinders of the hydraulic brakes 20L, 20R, 21L, 21R, whereby the braking force of the hydraulic brakes 20L, 20R, 21L, 21R varies. At this time, as shown in FIG. 4, the braking force of the hydraulic brakes 20L, 20R, 21L, 21R increases monotonously with increase of the hydraulic fluid pressure P (in other words, with increase in the amount of depression of the brake pedal 18). For example, a braking force Fa1 is obtained at the hydraulic fluid pressure P1 of the brake valve 19 (in other words, at the amount of depression θ1 of the brake pedal 18).

As a significant feature of this embodiment, an oil pressure sensor 22 is provided for detecting the hydraulic fluid pressure P which is outputted from the brake valve 19 to the hydraulic brakes 20L, 20R, 21L, 21R. The control unit 14, as a second function (brake control function) thereof, performs predetermined arithmetic processing for a detection signal inputted from the oil pressure sensor 22 and determines whether the hydraulic fluid pressure P of the brake valve 19 is not smaller than the preset value P1, that is, whether the amount of depression of the brake pedal 18 is not smaller than the preset value θ1. For example, when the hydraulic fluid pressure P of the brake valve 19 is not smaller than the preset value P1, that is, when the amount of depression of the brake pedal 18 is not smaller than the preset value θ1, the control unit 14 causes the inverters 26L, 26R to operate as power rectifiers and causes the traveling motors 13L, 13R to operate as generator-type retarders (more specifically, it causes the traveling motors 13L, 13R to operate as generators, thereby converting kinetic energy into electrical energy to actuate the brake). The generated electric power is fed to a heat radiator 23. In the heat radiator 23, the energy generated by the traveling motors 13L, 13R is converted to thermal energy by passing an electric current through a resistor, and the resistor is cooled by a cooling fan.

Figure 9:
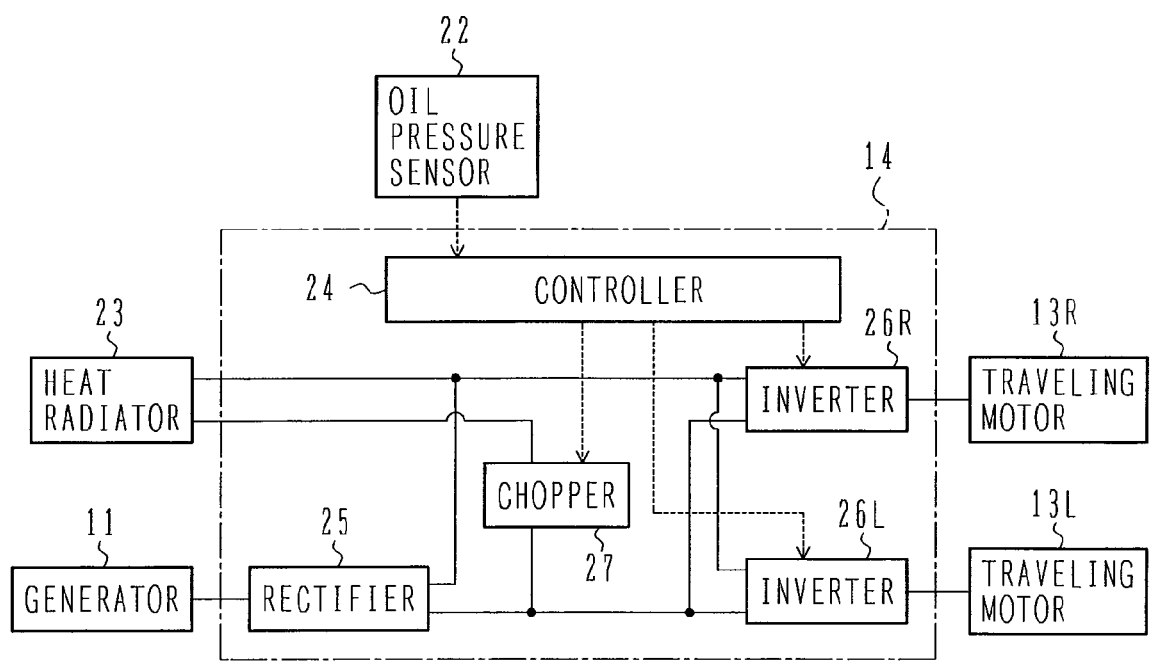
FIG. 9 is a block diagram showing a functional construction of the control unit as a constituent of the electric-drive-dump-truck brake system of the embodiment.

FIG. 9 is a block diagram showing a functional construction of the control unit 14.

In FIG. 9, the control unit 14 includes a controller 24 which performs predetermined arithmetic processing for signals inputted from the oil pressure sensor 22, etc., the rectifier 25 for converting the alternating current provided from the generator 11 into a direct current, the inverters 26L, 26R, and a chopper 27 (a switch circuit) for switching from a connected state to a disconnected state, or vice versa, between the inverters 25L, 25R and the heat radiator 23. When the inverters 26L, 26R operate as a power inverter, the inverters 26L, 26R convert the direct current provided from the rectifier 25 into an alternating current and supply the alternating current to the traveling motors 13L, 13R. When the inverters 26L, 26R operate as a power rectifier, the inverters 26L, 26R convert the alternating current generated by the traveling motors 13L, 13R into a direct current.

Figure 5:
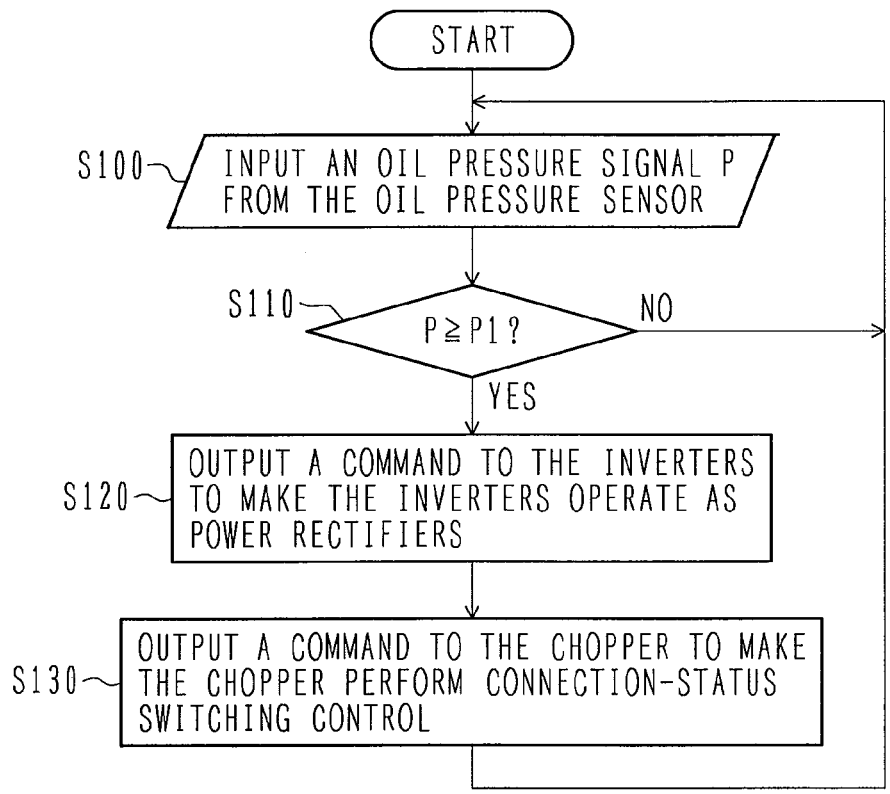
FIG. 5 is a flow chart showing the contents of control processing related to a brake control function of a control unit as a constituent of the electric-drive-dump-truck brake system of the embodiment.

FIG. 5 is a flow chart showing the contents of control processing related to the brake control function of the control unit 14.

In FIG. 5, first in step 100, the controller 24 in the control unit 14 reads a detection signal provided from the oil pressure sensor 22, then in step 110, determines whether the hydraulic fluid pressure P outputted from the brake valve 19 to the hydraulic brakes 20L, 20R, 21L, 21R is not smaller than the predetermined value P1, that is, whether the amount of depression of the brake pedal 18 is not smaller than the predetermined value θ1. For example, when the hydraulic fluid pressure P is smaller than the predetermined value P1 (in other words, when the amount of depression of the brake pedal 18 is smaller than the predetermined value θ1), the answer to the conditional statement in step 100 is negative, and the processing flow returns to step 100, followed by repetition of the same procedure as above. On the other hand, when the hydraulic fluid pressure P is not smaller than the predetermined value P1 (in other words, when the amount of depression of the brake pedal 18 is not smaller than the predetermined value θ1), the answer to the conditional statement in step 100 is affirmative, and the processing flow shifts to step 120.

Figure 6:
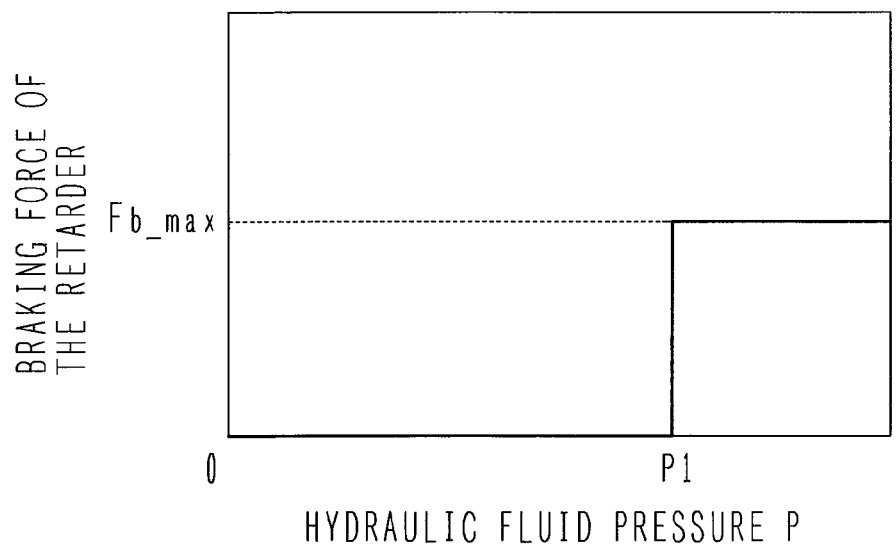
FIG. 6 is a characteristic diagram showing a relation between the hydraulic fluid pressure in the brake valve and a braking force of a generator-type retarder in the electric-drive-dump-truck brake system of the embodiment.

In step 120, the controller 24 outputs a command for making the inverters 26L, 26R operate as a power rectifier, then in step 130, a command for making the chopper 27 perform connection-status switching control. As a result, the traveling motors 13L, 13R operate as generator-type retarders, and an alternating current generated thereby is converted to a direct current through the inverters 26L, 26R and is outputted to the heat radiator 23 through the chopper 27. At this time, in this embodiment, the braking force of the generator-type retarder takes a maximum value Fb_max (in an actual case, however, the maximum value Fb_max varies in accordance with the vehicle body speed) in the range in which the hydraulic fluid pressure P is not lower than P1, as shown in FIG. 6.

Figure 7:
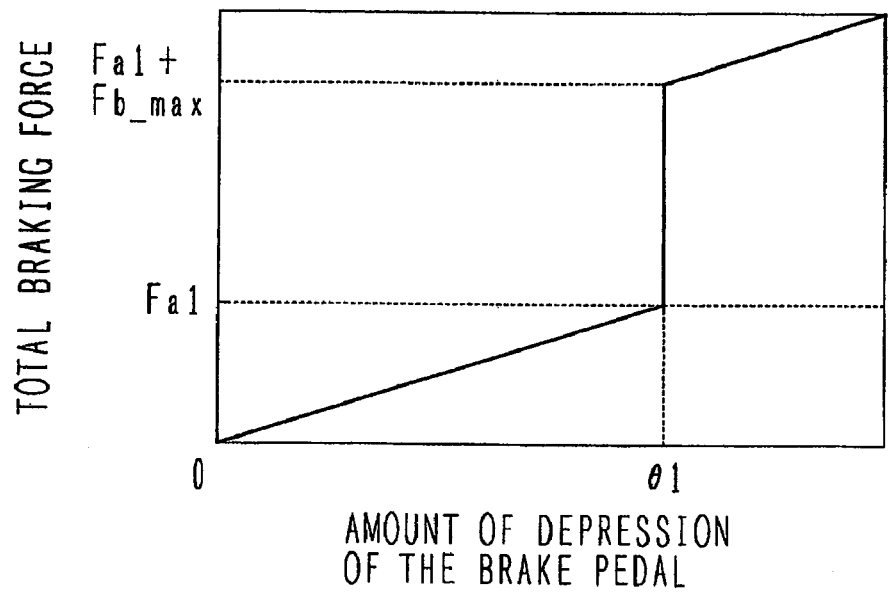
FIG. 7 is a characteristic diagram showing a relation between the amount of depression of the brake pedal and a total braking force of the hydraulic brake and generator-type retarder in the electric-drive-dump-truck brake system of the embodiment.
Figure 8:
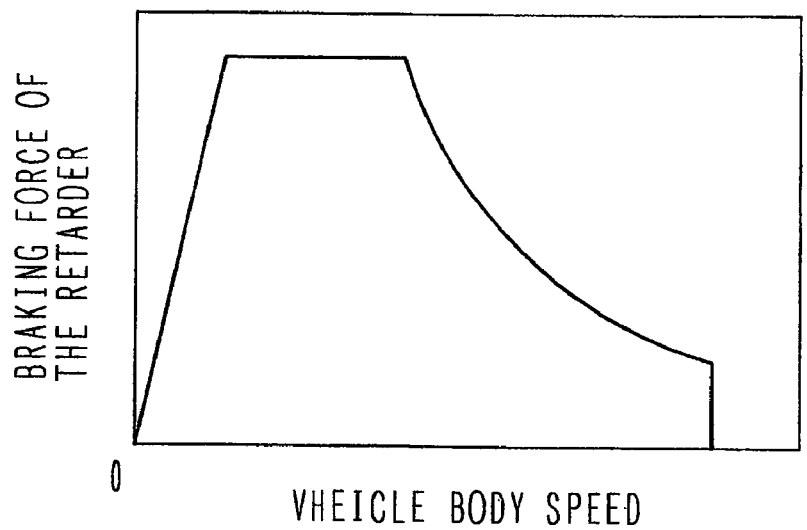
FIG. 8 is a characteristic diagram showing a relation between the vehicle body speed and a braking force of an electromagnetic-type retarder.

In this manner, according to this embodiment, as shown in FIG. 7, a total braking force of the hydraulic brakes 20L, 20R, 21L, 21R and the generator-type retarder is obtained in accordance with the amount of depression of the brake pedal 18. More specifically, when the amount of depression of the brake pedal 18 is smaller than θ1, there is obtained a braking force of the hydraulic brakes 20L, 20R, 21L, 21R proportional to said amount of depression, and the total braking force becomes Fa1 when the amount of depression is θ1. When the amount of depression of the brake pedal 18 is not smaller than θ1, there is obtained the total sum of a braking force of the hydraulic brakes 20L, 20R, 21L, 21R proportional to the amount of depression and the maximum value Fb_max of the braking force of the generator-type retarder.

In the construction described above, the oil pressure sensor 22 constitutes detector means for detecting an amount of depression of the brake pedal, and the brake control function of the control unit 14 constitutes control means for controlling the traveling motors so as to operate the same motors as generator-type retarders when the amount of depression of the brake pedal detected by the detector means is not smaller than a predetermined value, those means recited in the scope of the claims.

Next, the operation, as well as the function and effect, of this embodiment will be described below.

For example, when the driver depresses the brake pedal 18 so that the amount of depression of the brake pedal 18 becomes smaller than the predetermined value θ1 with the intention of decelerating or stopping the dump truck 1, a hydraulic fluid pressure proportional to the amount of depression of the brake pedal 18 is outputted from the brake valve 19, and the hydraulic brakes 20L, 20R, 21L, 21R operate. In this way, a braking force of the hydraulic brakes 20L, 20R, 21L, 21R proportional to the amount of depression of the brake pedal 18 can be obtained irrespective of the vehicle body speed. As a result, it is possible to ensure fine operability of the brake which is important for when, for example, the dump truck 1 is to be stopped at a predetermined position (e.g., a loading site).

On the other hand, when, for example, the operator depresses the brake pedal 18 so that the amount of depression of the brake pedal 18 becomes not smaller than the predetermined value θ1, not only the hydraulic brakes 20L, 20R, 21L, 21R operate, but also, the answer to the conditional statement in step 110 through step 100 in FIG. 5 becomes affirmative and the processing flow shifts to in steps 120, 130, the control unit 14 makes the traveling motors 13L, 13R operate as generator-type retarders. Consequently, it is possible to enhance the braking force for example in comparison with the case where only the hydraulic brakes 20L, 20R, 21L, 21R are operated.

Thus, in this embodiment, the braking force of the brake can be enhanced while fine operability of the brake is ensured.

Although in the above embodiment the oil pressure sensor 22 for detecting the hydraulic fluid pressure outputted from the brake valve 19 to the hydraulic brakes 20L, 20R, 21L, 21R is used as the detector means for detecting the amount of depression of the brake pedal 18, this constitutes no limitation. For example, the oil pressure sensor 22 may be substituted by for example an angle sensor for detecting a depression angle of the brake pedal 18. Also in this case, the same effect as above can be obtained.

Further, although in the above embodiment the control unit 14 performs control so as to afford the maximum braking force value Fb_max of the generator-type retarder when the hydraulic fluid pressure P takes a value of not smaller than P1, no limitation is made thereto. For example, control may be exercised so that the braking force of the generator-type retarder increases continuously with increase of the hydraulic fluid pressure P (in other words, the braking force of the generator-type retarder may be changed continuously in accordance with the amount of depression of the brake pedal). Also in this case, the same effect as above can be obtained.

The invention claimed is:

1. A brake system in an electric drive dump truck having an engine, a generator driven by said engine, traveling motors driven with electric power generated by said generator, and service brakes which are operated by operation of a brake pedal, both when an amount of depression of said brake pedal is less than a predetermined value and when an amount of depression of said brake pedal is not less than the predetermined value, said brake system comprising:
    detector means for detecting the amount of depression of said brake pedal; and
    control means for controlling said traveling motors so that said traveling motors do not operate as generator retarders when the amount of depression of said brake pedal detected by said detector means is less than the predetermined value, and do operate as generator retarders when the amount of depression of said brake pedal detected by said detector means is not less than the predetermined value.

2. The brake system in the electric drive dump truck according to claim 1, wherein said control means causes the braking force of the generator retarders to change continuously in accordance with the amount of movement of said brake pedal.

3. The brake system in the electric drive dump truck according to claim 1, wherein said service brakes are hydraulic brakes, wherein there is provided a hydraulic valve adapted to produce a hydraulic fluid pressure corresponding to said amount of movement of said brake pedal and to output the hydraulic fluid under pressure to said hydraulic brakes, and further wherein said detector means is an oil pressure detector for detecting the hydraulic fluid outputted from said hydraulic valve under pressure to said hydraulic brakes.

* * * * *